US00RE36778E

United States Patent [19]

DeLeo

[11] E Patent Number: Re. 36,778

[45] Reissued Date of Patent: Jul. 18, 2000

[54] CODED HEALTH-CARE GLOVE

[75] Inventor: David B. DeLeo, Norwalk, Conn.

[73] Assignee: Microflex Corporation, Reno, Nev.

[21] Appl. No.: 08/869,730

[22] Filed: Jun. 5, 1997

Related U.S. Patent Documents

Reissue of:

[64] Patent No.: 5,421,033
Issued: Jun. 6, 1995
Appl. No.: 08/157,503
Filed: Nov. 26, 1993

[51] Int. Cl.[7] ..... A41D 19/00

[52] U.S. Cl. ..... 2/161.7; 2/168

[58] Field of Search ..... 2/159, 161.7, 168, 2/163, 160, 161.8, 161.1, 167, 169; 40/299, 328, 629, 633

[56] References Cited

U.S. PATENT DOCUMENTS

| | | | |
|---|---|---|---|
| 919,406 | 4/1909 | Warren . | |
| 1,279,855 | 9/1918 | Garvey | 2/168 |
| 1,559,114 | 10/1925 | Maranville . | |
| 1,911,500 | 5/1933 | Gowdy et al. . | |
| 2,036,413 | 4/1936 | Herbruck | 2/168 |
| 2,451,758 | 10/1948 | Malm | 2/168 |
| 2,581,249 | 1/1952 | Ganz | 25/156 |
| 3,094,704 | 6/1963 | Abildgaard | 2/167 |
| 3,500,477 | 3/1970 | Meszaros | 2/161.8 |
| 3,633,216 | 1/1972 | Schonholtz | 2/168 |
| 3,852,826 | 12/1974 | Schindler | 2/168 |
| 3,872,515 | 3/1975 | Miner et al. | 2/168 |
| 4,084,265 | 4/1978 | Anfelt | 2/163 |
| 4,218,778 | 8/1980 | Stansbury | 2/163 |
| 4,507,807 | 4/1985 | Karkanen | 2/163 |
| 4,884,300 | 12/1989 | Vistins | 2/162 |
| 4,942,626 | 7/1990 | Stern et al. | 2/163 |
| 5,020,160 | 6/1991 | Cano | 2/159 |
| 5,173,966 | 12/1992 | DeLeo | 2/168 |

FOREIGN PATENT DOCUMENTS

| | | | |
|---|---|---|---|
| 796667 | 4/1936 | France | 2/163 |
| 818827 | 10/1951 | Germany . | |
| 31926 | 2/1985 | Japan . | |
| 1105471 | 3/1968 | United Kingdom | 2/168 |
| 2144623 | 3/1985 | United Kingdom . | |
| 2208348 | 3/1989 | United Kingdom . | |

*Primary Examiner*—Amy B. Vanatta
*Attorney, Agent, or Firm*—Evan M. Kent; Stewart L. Gitler

[57] ABSTRACT

A health-care glove constituted of thin elastic rubber-like material and having a thumb member at one side edge and a pinkie member at the opposite side edge. The glove has visual indicia for indicating to the user, the location of the thumb member so as to enable him to initially pick up the glove and easily apply it onto his hand, with the thumb member and pinkie member in the proper relative positions.

6 Claims, 1 Drawing Sheet

CODED HEALTH-CARE GLOVE

Matter enclosed in heavy brackets [ ] appears in the original patent but forms no part of this reissue specification; matter printed in italics indicates the additions made by reissue.

NO CROSS REFERENCES TO RELATED APPLICATIONS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

Field of the Invention

This invention relates to improvements in the glove constructions disclosed in my prior U.S. Pat. No. 5,173,966, granted Dec. 29, 1992, and entitled CODED HEALTH-CARE GLOVE.

It is respectfully requested that the entire disclosure of U.S. Pat. No. 5,173,966 be incorporated into the present application, by specific reference.

DESCRIPTION OF THE RELATED ART INCLUDING INFORMATION DISCLOSED UNDER 37 CFR 1.97–1.99

The following references were made of record during the prosecution of U.S. Pat. No. 5,173,966 above identified, and together with the references cited in each patent, are considered to be of interest in the field to which the present invention pertains:

| U.S. Pat. Nos.: | | |
|---|---|---|
| 919,406 | 1,559,114 | 1,911,500 |
| 2,451,758 | 2,581,249 | 3,094,704 |
| 3,633,216 | 3,852,826 | 3,872,515 |
| 4,084,265 | 4,218,778 | 4,884,300 |
| 5,020,160 | | |
| British Published Applications Nos.: | | |
| 2,144,623A | 2,208,348 | |
| German Patent No. 818,827 | | |
| Japanese Application No. 60-31926 | | |

U.S. Pat. No. 919,406 discloses a surgical glove having a textured outer surface except at the tips of the index finger, the middle finger, the ring finger and the pinkie, respectively. The texturing allegedly assists the wearer in gripping various instruments, whereas the bare tip portions of the fingers retain the tactile sense considered necessary in successful performance of surgical procedures.

U.S. Pat. No. 1,559,114 discloses a rubber glove adapted for handling garments, the glove having overlays or patches with raised projections which purportedly facilitate grasping and manipulating a garment, as required during cleaning thereof.

U.S. Pat. No. 1,911,500 discloses a glove for use by workmen involved in food packing, the glove having a sheet-like rubber patch on the inside of the tip of the forefinger, to facilitate grasping of individual sheets of tissue-like wrapping paper, one sheet at a time.

U.S. Pat. No. 2,451,758 illustrates a rubber glove that is formed on a mold having grooves extending from the wrist toward the fingers. The grooves give rise to the formation of elongate ribs in the finished glove, for strengthening, and to provide air-channels for ventilation of the user's hand while the glove is being worn.

U.S. Pat. No. 2,581,249 relates to a method for producing a mold form for a glove, the form having roughened portions in order to impart a similar or corresponding roughened texture to a selected portion of the glove produced from the form.

U.S. Pat. No. 3,094,704 discloses a method of producing gloves by means of either a liquid rubber spray applied to a series of mold forms, or else a dipping process that is carried out using such a series of mold forms. A tab (33) is optionally incorporated in the glove, which purportedly ". . . facilitates the application of the glove to the surgeon's or physician's hand.", col. 4, line 54 of the patent.

U.S. Pat. No. 3,633,216 illustrates a surgical glove having on both the thumb and forefinger, a double layer thickness of material, to minimize the consequences of an inadvertent puncture at these areas. In one embodiment, there is provided a colored saline liquid between two thicknesses, which leaks out if a puncture of either layer has inadvertently occurred, thereby warning the physician of the puncture.

U.S. Pat. No. 3,852,826 relates to a method of making surgical gloves having color-coded bands at the cuff, corresponding respectively to different glove sizes. The colored cuff band is preferably formed by dipping of a partially-cured molded glove, and the band and glove are thereafter fully cured together, to form an integrally molded glove assemblage.

U.S. Pat. No. 3,872,515 illustrates a surgical glove formed of silicone rubber that is non-allergenic, and which has an embedded dry lubricant on its inner surface. A tubular reinforcing ring is placed on the partially-cured glove, and material from the latter rolled over the ring through one turn, to form an enclosed bead-like structure at the wrist portion of the glove. Indicia are provided on the exterior of the glove, to indicate size.

U.S. Pat. No. 4,084,265 relates to a glove formed of two thin hand-shaped sheets welded to another at their peripheral edges, and wherein one sheet has embossed formations providing protrusions that face the surface of the other sheet. Undesirable effects of adhesion of the two sheets are minimized whereby there is facilitated the insertion of the user's hand into the glove.

U.S. Pat. No. 4,218,778 illustrates a surgical glove characterized by different cross-sectional configurations along the forefinger and thumb, to facilitate a tight fit and to assist in providing improved tactile sensitivity to the tips of the finger and thumb of the physician. Provision is made for marking the cuff as to its size.

U.S. Pat. No. 4,384,300 illustrates a glove having an internal adhesive strip on the inner surface of the cuff, permitting the cuff to be "bunched" as required, to tighten the cuff on the wearer's hand. This prevents the glove from slipping from the hand, and also prevents entry of foreign matter past an open or loosely-fitting cuff. A method for forming such gloves is also shown.

U.S. Pat. No. 5,020,160 discloses a protective rubber glove for use by a motorist while pumping gasoline or diesel fuel into a vehicle, to avoid soiling of the motorist's hand. The glove has a longitudinal tear line by which it can be readily stripped off the wearer's hand and discarded in a sanitary manner, following use.

British Published Application No. GB 2 144 623A illustrates a glove formed preferably of fabric, and with a plastic surface texture or pattern applied to the outer surface of the glove, in order to improve the gripping characteristics thereof. The pattern is applied through an apertured mask or plate, liquid plastic being forced through the apertures of the plate and onto the surface of the glove, following which the deposited plastic is allowed to cure.

British Published Application No. GB 2 208 348A discloses a glove having printed or colored material applied thereto, and a transparent coating thereafter provided over the printed or colored material, so as to seal the same and isolate it against inadvertent damage or removal.

Japanese Application No. 60-31926 discloses a method for imparting patterns or images to gloves, using automated equipment.

German Patent No. 818,827 discloses a laboratory glove having suction cups (2) at the tips of the thumb, forefinger and middle fingers, respectively.

While some of the gloves noted above have met with limited success, it is believed that few, if any, are currently in the marketplace. Cost considerations, coupled with multistep manufacturing processes are believed to render many of the prior art devices deficient from a practical standpoint.

SUMMARY OF THE INVENTION

The above disadvantages and drawbacks of prior health-care gloves are largely obviated by the present invention which has for one object the provision of a novel and improved health-care glove which in a very pronounced and distinctive manner, instantly identifies for the user, the locations of the thumb and pinkie. As a consequence, the wearer can, with solely a quick glance, unmistakeably determine the locations of these fingers and thereafter insert his hand into the glove quickly and without confusion.

Another object of the invention is to provide an improved health-care glove as above set forth, which is simple in its structure and is easily produced, by utilizing simple spraying or dipping processes.

Still another object of the invention is to provide an improved health-care glove as above characterized, which can be manufactured at substantially the same cost as conventional gloves, there being no additional steps involved with the fabrication as compared with such conventional constructions.

The above objects are accomplished by a health-care glove constituted of thin elastic rubber-like material, the glove having inner and outer surfaces, and having a thumb member and a pinkie member at opposite side edges of the glove. Three fingers are disposed intermediate the thumb member and pinkie member, the thumb member and pinkie member normally presenting a similar and confusing appearance when casually viewed. The glove is provided with distinctive, visible indicia means for quickly and unmistakably indicating to the user the location of a predetermined one of the members at one of the side edges of the glove, the indicia means comprising back-to-back, complementary inner and outer surface undulations on the inner and outer surfaces of said one of the side edges of said glove. The indicia means further comprises back-to-back, complementary inner and outer surface undulations on the inner and outer surfaces of one of said fingers which is immediately adjacent to the one side edge of the glove which has the surface undulations, so as to enhance the visual effect provided by the latter.

The arrangement is such that the thumb and forefinger can be provided with the distinctive identifying indicia, or alternately, the pinkie and fourth (ring) fingers provided with such indicia. In either instance, the wearer is apprised beforehand, as for example when he opens the box of gloves, as to the particular orientation of the indicia, and thereafter is capable of instantly recognizing the markings and donning the glove in the proper manner, i.e. with the thumb and pinkie portions properly oriented with respect to his hand.

In a particularly advantageous embodiment, the markings take the form of through-the-wall undulations or nib/recess combinations in the opposite surfaces of the thumb and forefinger of the glove, which not only assist the user visually, but can provide an improved gripping capability to such thumb and forefinger; it is considered that this improved gripping capability enjoys important benefits, especially when the gloves are used in a surgical environment. In this connection, it is well known in the medical profession that body fluids, e.g. blood, saliva, etc., render the outer surface of a latex glove extremely slippery, often causing difficulty for the physician in gripping instruments, dressings, sutures, and the like with the necessary precision and control.

Other features and advantages will hereinafter appear.

BRIEF DESCRIPTION OF THE DRAWINGS

In the drawings, illustrating a preferred embodiment of the invention.

DESCRIPTION OF THE PREFERRED EMBODIMENT

Figure 1:
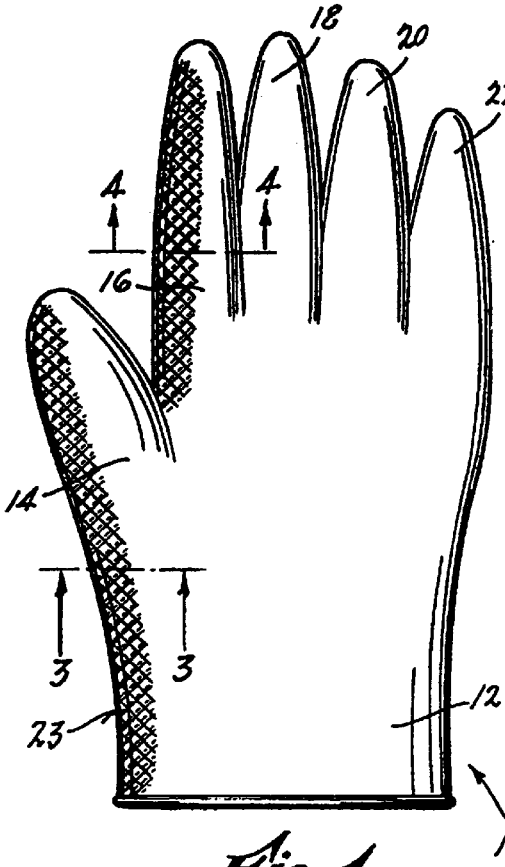
FIG. 1 is a front plan view of the palm side of a health-care glove constructed in accordance with the principles of the present invention.

Referring now to the figures there is illustrated a glove generally designated by the numeral 10, constituted of transparent or translucent latex or other rubber-like material, comprising a wrist portion 12, a thumb member 14, index finger or forefinger 16, middle finger 18, ring finger 20 and pinkie member 22. The thumb member 14 is disposed at one side edge 23 of the glove and the pinkie member 22 is disposed at an opposite side edge thereof.

Figure 3:
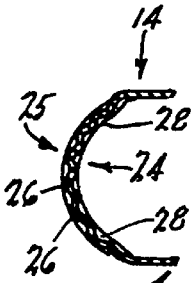
FIG. 3 is a fragmentary section taken on the line 3—3 of FIG. 1.
Figure 4:
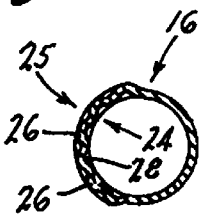
FIG. 4 is a fragmentary section taken on the line 4—4 of FIG. 1.

In accordance with the present invention there are provided strikingly visible indicia on the one side edge 23 of the glove, constituting visible indicia means for quickly and unmistakeably indicating to the user the location of a predetermined one of the members 14 or 22 of the glove. As seen in FIG. 3, the indicia means comprises complementary inner and outer surface undulations 24, 25 on the thumb member 14 and inner and outer surfaces respectively of the said side edge 23. In addition, as shown in FIG. 4, supplementary indicia are provided on the index finger 16, which is adjacent the thumb member 14, also in the form of inner and outer surface undulations 24, 25 on the inner and outer surfaces respectively of the index finger or forefinger 16. The combination of the undulations on the side edge 23 and thumb member 14, and forefinger 16 have been found to significantly enhance the visibility by the user, as compared to some of the gloves shown in my U.S. Pat. No. 5,173,966 above identified. The wearer is thus more readily alerted to the location of the thumb member with respect to the pinkie member of the glove when the latter is either by itself, or else disposed in a stack of similar gloves, as for example, on a table or in a storage box.

In the preferred embodiment, I have discovered that optimum visibility can be obtained where the undulations 24, 25 are located on both the thumb member 14 and forefinger 16; however, by the invention, undulations (not shown) could similarly be imparted to the pinkie member 22 and ring finger 20 of the glove 10, to achieve a somewhat similar objective, namely quickly and unmistakeably indicating to the user the location of the pinkie member 22 at the time that the glove 10 is to be applied to the user's hand.

Figure 2:
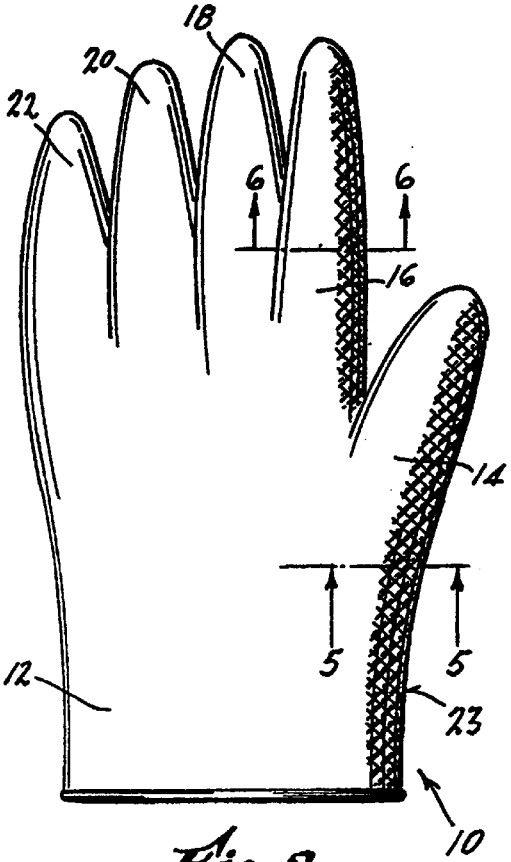
FIG. 2 is a rear plan view of the glove of FIG. 1.
Figure 7:
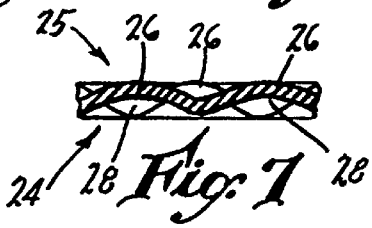
FIG. 7 is an enlarged fragmentary sectional view showing in greater detail the pin-cushion-like wall configuration, as for example considering the section taken on the line 5—5 of FIG. 2.

The nature of the undulations 24, 25 is shown in FIGS. 3 and 4, as well as FIG. 7, which is a fragmentary enlargement of the portions of the glove 10 at the location of the section 5—5 of FIG. 2. Specifically, the undulating wall portions of the thumb member 14 and index finger 16 are in the nature of repetitive pin-cushion diagonal configurations which present eye-attracting surfaces that enhance the likelihood of the user to distinguish the proper placement of the glove when it is being put on.

Figure 6:
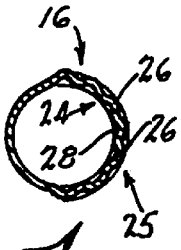
FIG. 6 is a fragmentary section taken on the line 6—6 of FIG. 2.

The thumb member 14 thus is more clearly seen in FIG. 7 to have a plurality of raised hubs or nibs 26, produced by a like configuration in the hand form from which the glove is made (such hand form being shown in FIG. 6 of my patent '966). Formation is preferably accomplished in a dipping operation as described in that patent. FIGS. 3 and 4 show the hubs or nibs 26 on the exterior or outer surface of the glove. On the inner surface of the glove, there are hollows or recesses 28, which underlie the respective nibs or hubs 26 at the exterior of the glove 10. The recesses 28 are in the form of small depressions in the contour of the inner surface, as shown in FIG. 7.

An important consideration in successfully carrying out the invention lies in the fact that the provision of hubs or nibs 26 as provided by the invention, which are specifically integrally formed, does not require any secondary operations, and thus the cost of the glove of the invention is no greater than that of a conventionally formed rubber glove that does not have integrally formed hubs or nibs.

Figure 5:
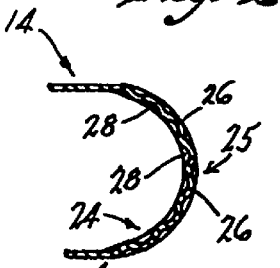
FIG. 5 is a fragmentary section taken on the line 5—5 of FIG. 2.

FIGS. 5 and 6 are fragmentary sections similar to FIGS. 3 and 4. The undulations imparted to the thumb member 14 and forefinger 16 are preferably of a similar configuration as to shape and spacing, etc. In FIGS. 5 and 6, recesses which underlie the respective nibs are indicated 28, whereas the overlying nibs are designated 26.

In a preferred form, an especially aesthetically pleasing construction is obtainable where the nibs 26 are spaced generally uniformly from one another; they may be arranged in either straight or staggered rows that are coextensive with one another. Configurations other than the above are possible, however, as can be readily appreciated.

It will now be seen from the foregoing that I have provided an improved health-care glove of latex or similar material, wherein improved high-visibility indicia are provided at both a side edge of the glove and at the adjacent one of the three middle fingers of the glove, to thereby readily apprise the user as to the locations of either the thumb or pinkie members. The indicia, where incorporated into the mold used to initially form the gloves, entail little or no additional manufacturing cost. The subsequent expense involved in molding such gloves containing the integrally formed indicia as provided by the invention is thus essentially the same as that for conventional gloves of a type without such indicia. As a consequence, there is provided a significantly improved product having important features and advantages over the devices of the prior art, but without any significant manufacturing cost differential, and without any additional measures or steps being required in the fabrication.

The improved glove of the invention, when stripped from the form, automatically has incorporated therein the desired undulations at the desired locations. The use of dyes, marker strips, or other marking techniques is thus completely eliminated. Also eliminated are any hazards inherent with the use of dyes, strips and the like, since in the glove of the present invention, there are no added structural components which might peel off or become misplaced; in addition, since no chemical coloring of any type is employed, the sterility of the glove is not adversely affected. Nor are considerations relating to toxicological or allergenic materials involved, since the material of the glove of the invention can be exactly the same as that of conventional health-care gloves, and the same sterility techniques and features are thereby carried over to the improved gloves, as can be readily appreciated.

The disclosed health-care glove is thus seen to represent a distinct advance and improvement in the medical field.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A one piece all integral health-care glove constituted of thin elastic rubber material, said glove having inner and outer surfaces, and having a thumb member and a pinkie member at opposite side edges of the glove, and having three fingers including an index finger disposed intermediate the thumb member and pinkie member, said thumb member and pinkie member normally presenting a similar and confusing appearance when casually viewed, and said glove having integral distinctive, visible indicia means for quickly and unmistakably indicating to the user the location of said thumb member, said indicia means comprising back-to-back, complementary inner and outer surface undulations on the inner and outer surfaces of the rubber material making up solely said index finger and thumb member.

2. A glove as set forth in claim 1, wherein said undulations comprise external raised nibs on the outer surface of the glove, and corresponding depressions on the inner surface of the glove, said depressions respectively underlying said raised nibs.

3. A glove as set forth in claim 2, wherein said nibs are spaced substantially uniformly apart from one another.

*4. A one piece all integral health-care glove comprising thin elastic rubber material, said glove having inner and outer surfaces and having a thumb member and a pinkie member at opposite side edges of the glove, and having three fingers including an index finger disposed intermediate the*

*thumb member and pinkie member, said thumb member and pinkie member normally presenting a similar and confusing appearance when casually viewed, and said glove having integral distinctive, visible indicia means for quickly and unmistakably indicating to the user the location of said thumb member, said indicia means comprising back-to-back, complementary inner and outer surface undulations on the inner and outer surfaces of the rubber material making solely said index finger and thumb member.*

*5. A glove as set forth in claim 4, wherein said undulations comprise external raised nibs on the outer surface of the glove, and corresponding depressions on the inner surface of the glove, said depressions respectively underlying said raised nibs.*

*6. A glove as set forth in claim 5, wherein said nibs are spaced substantially uniformly apart from one another.*

* * * * *